No. 786,995. Patented April 11, 1905.

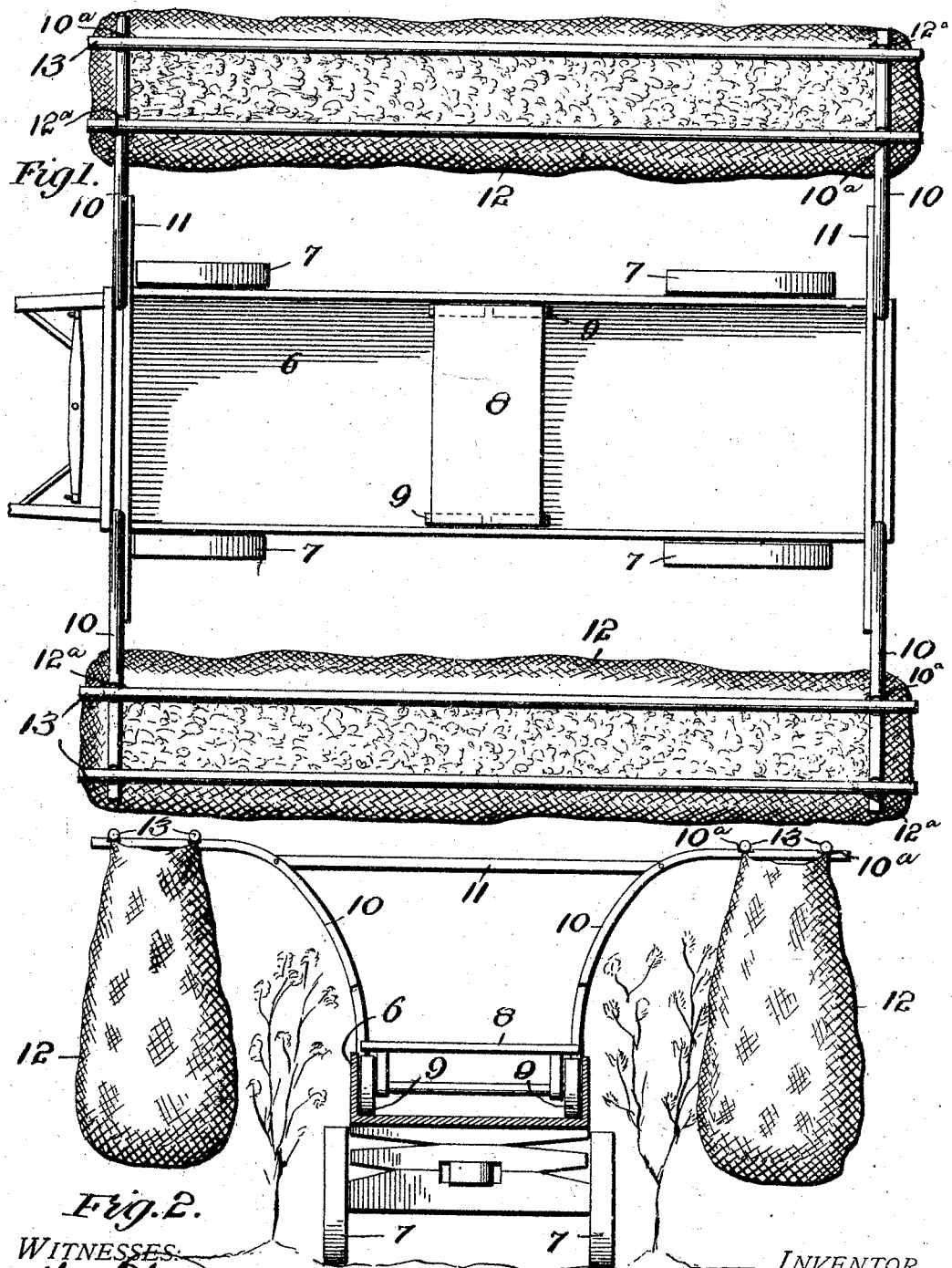

UNITED STATES PATENT OFFICE.

GEORGE G. RICHARDSON, OF SAYRE, OKLAHOMA TERRITORY.

COTTON-PICKER'S WAGON.

SPECIFICATION forming part of Letters Patent No. 786,995, dated April 11, 1905.

Application filed August 22, 1904. Serial No. 221,732.

*To all whom it may concern:*

Be it known that I, GEORGE G. RICHARDSON, a citizen of the United States, residing at Sayre, in the county of Roger Mills and Territory of Oklahoma, have invented new and useful Improvements in Cotton-Pickers' Wagons, of which the following is a specification.

This invention is a vehicle or wagon designed particularly for service in cotton-fields to assist the picker in picking cotton.

The object of the invention is to provide means for transporting the cotton-picker between the rows of cotton and for also carrying bags into which the picked cotton is placed.

With this object in view the invention comprises, essentially, a low narrow wagon of proper size and shape to be drawn between cotton-rows of ordinary distance. This wagon carries a stool or seat constructed to roll from one end of the wagon-body to the other, on which stool the picker may sit and reach the cotton-plants on either side of the wagon. The wagon-body also supports hangers which carry bags to receive the cotton gathered, one of said bags being carried on each side. The hangers are of such shape that the bags hang outside of the adjacent rows of plants, but still within reach of the picker seated in the wagon.

The invention is illustrated in the accompanying drawings, in which—

Figure 1 is a top plan view of the device; and Fig. 2 is an end elevation, partly in section.

Referring specifically to the drawings, 6 indicates the wagon-body, which is comparatively long and narrow, so that it will pass between the rows of cotton-plants. This body is carried upon low wheels 7, so that it will be about the same height as ordinary cotton-plants.

8 indicates a traveling seat or stool which is mounted upon wheels 9, so that it can be rolled from one end of the wagon-box to the other, and the wagon is provided with the usual shafts and devices for the attachment of a draft-animal.

At 10 are indicated hangers, preferably secured at the corners of the wagon-box and projecting up and out on each side. Tie-rods 11 connect and support these hangers. The bags for the cotton are indicated at 12, one of which is suspended on each side from each pair of hangers. The bags are long and narrow, the length being substantially equal to that of the wagon, and it is intended that the two of them will be large enough to hold a day's picking for one man. The bags, as stated, are long and narrow, extending lengthwise beside the wagon, and the hangers extend far enough out so that the bags will hang on the outside of the adjacent rows of plants in a manner apparent from Fig. 2. They will thus serve in a measure to hold the plants close to the wagon within easy reach of the picker.

Each bag is formed with two parallel poles or bars 13 at the mouth thereof, and these poles rest upon the outer ends of the hangers 10, thereby supporting the bag at both ends and producing a long narrow mouth into which cotton may be placed in the bag by the picker from any place in the wagon. Preferably the material of the bag has holes $12^a$ formed therein under the poles 13, and the ends of the hangers 10 have notches $10^a$, in which the ends of the poles 13 rest, so when the bags are placed on the hangers, with the ends of the hangers extending through the holes $12^a$, the bags will not be liable to accidentally drop off, but nevertheless can be readily lifted off the hangers when desired.

In operation the wagon is drawn between the rows of cotton and halted while the picker strips the plants beside the wagon. He can get at all the plants while seated on the traveling seat by rolling the same back or forth, and the cotton gathered is deposited in the bags. When the adjacent plants are stripped, the wagon is moved up a length, and so on.

The invention will be found of great assistance to cotton-pickers. It takes away the burden of carrying the cotton around and also the loss of time incident to weighing and emptying, because, as said before, bags of the size described will carry a whole day's picking. The seated position permitted by the device avoids the tiresome stooped position incident to picking on foot and the carriage of a bag on the body.

What I claim as new, and desire to secure by Letters Patent, is—

1. The combination with a wagon, and a traveling seat therein, of receptacles hung from the wagon, along the sides thereof, within reach from the seat, substantially as described.

2. The combination with a wagon, of hangers projecting therefrom, on each side, poles resting on the hangers and extending along beside the wagon, and bags hanging from said poles.

3. The combination with a wagon, of hangers projecting laterally at each end thereof, on each side, and a bag on each side of the wagon, having supporting-poles at the sides of its mouth, the ends of which poles rest on the hangers.

In testimony whereof I have signed my name to this specification in the presence of two subscribing witnesses.

GEORGE G. RICHARDSON.

Witnesses:
JASPER FARREMAN,
P. D. CRAWFORD.